United States Patent
Sekine et al.

(10) Patent No.: US 10,274,906 B2
(45) Date of Patent: Apr. 30, 2019

(54) CAM PROFILE DATA CREATION APPARATUS AND SYNCHRONIZATION CONTROLLER

(71) Applicant: FANUC CORPORATION, Minamitsuru-gun, Yamanashi (JP)

(72) Inventors: Daisuke Sekine, Yamanashi (JP); Takashi Idei, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 205 days.

(21) Appl. No.: 15/358,571

(22) Filed: Nov. 22, 2016

(65) Prior Publication Data
US 2017/0146961 A1 May 25, 2017

(30) Foreign Application Priority Data

Nov. 25, 2015 (JP) .................. 2015-229993

(51) Int. Cl.
G05B 13/02 (2006.01)
G05B 19/4097 (2006.01)
(52) U.S. Cl.
CPC ....... G05B 13/026 (2013.01); G05B 19/4097 (2013.01); G05B 2219/24075 (2013.01); G05B 2219/50234 (2013.01)
(58) Field of Classification Search
None
See application file for complete search history.

(56) References Cited

U.S. PATENT DOCUMENTS

| | | | | |
|---|---|---|---|---|
| 9,622,201 | B2 * | 4/2017 | Idei | G05B 19/416 |
| 2011/0044778 | A1 * | 2/2011 | Yamada | G05B 19/416 |
| | | | | 409/80 |
| 2013/0317653 | A1 * | 11/2013 | Ueda | F16H 25/08 |
| | | | | 700/275 |
| 2014/0088767 | A1 | 3/2014 | Shimamura et al. | |
| 2015/0177723 | A1 * | 6/2015 | Sawaragi | G05B 19/056 |
| | | | | 700/86 |
| 2015/0355633 | A1 | 12/2015 | Nagatani et al. | |

FOREIGN PATENT DOCUMENTS

| | | |
|---|---|---|
| JP | H 07-104855 A | 4/1995 |
| JP | 07244517 A | 9/1995 |
| JP | 2015122077 A | 7/2015 |
| WO | 2012124144 A1 | 9/2012 |
| WO | 2013175615 A1 | 11/2013 |
| WO | 2014119036 A1 | 8/2014 |

OTHER PUBLICATIONS

Decision to Grant a Patent for Japanese Application No. 2015-229993, dated Nov. 21, 2017 with translation, 6 pages.

* cited by examiner

Primary Examiner — Whitney Moore
(74) Attorney, Agent, or Firm — RatnerPrestia (57) ABSTRACT

A cam profile data creation apparatus sets cam profile data in which a phase of a drive shaft is associated with a displacement (set displacement) of a driven shaft, a rotation speed of the drive shaft, and an allowable error for the displacement of the driven shaft. A displacement (predictive displacement) of the driven shaft when the drive shaft rotates at the set rotation speed is found based on the set cam profile data, the set displacement and the predictive displacement are displayed to be comparable, and further a form of the display is changed depending on whether an error between the set displacement and the predictive displacement falls within the range of the allowable error.

5 Claims, 7 Drawing Sheets

CAM PROFILE DATA

| CAM SHAFT PHASE | DISPLACE-MENT |
|---|---|
| 0 | 0 |
| 15 | 1 |
| 30 | 3 |
| ... | ... |
| 345 | 1 |

| CAM SHAFT ROTATION SPEED |
|---|
| S1 |

| CAM SHAFT PHASE | ALLOWABLE ERROR |
|---|---|
| 0 | ε 1 |
| 15 | ε 2 |
| 30 | ε 3 |
| ... | ... |
| 345 | ε 24 |

CAM PROFILE DATA CREATION APPARATUS AND SYNCHRONIZATION CONTROLLER

BACKGROUND OF THE INVENTION

1. Field of the Invention

The present invention relates to a cam profile data creation apparatus and a synchronization controller, and particularly to a technique for adjusting an error between an operation of a driven shaft defined in cam profile data and an actual instruction operation for the driven shaft.

2. Description of the Related Art

Conventionally, electronic cams for electrically realizing similar operations to mechanical cams have been used. In order to control such electronic cams, at first, a cam profile data creation apparatus previously defines a table (hereinafter referred to as cam profile data) defining a correspondence relationship between a phase of a drive shaft and a displacement of a driven shaft. A synchronization controller then finds a displacement of the driven shaft synchronized with a phase of the drive shaft based on the cam profile data thereby to position the driven shaft. Thereby, operations equivalent to those of a mechanical cam having a certain profile can be electrically reproduced.

In such electronic cam control, a definition point, which is not used for positioning when a rotation speed of the drive shaft is increased, (which is paired data of a phase of the drive shaft and a displacement of the driven shaft, included in the cam profile data) may occur. A phase of the drive shaft is generally designed at a certain interval of $\theta_0$ in the cam profile data. Herein, a cycle (hereinafter referred to as control cycle) in which the synchronization controller actually performs an instruction operation on the driven shaft is assumed as $\tau$. The amount of change in phase of the drive shaft per control cycle $\tau$ is assumed as phase interval $\theta$. The phase interval $\theta$ is determined depending on a rotation speed of the drive shaft.

Figure 8A:
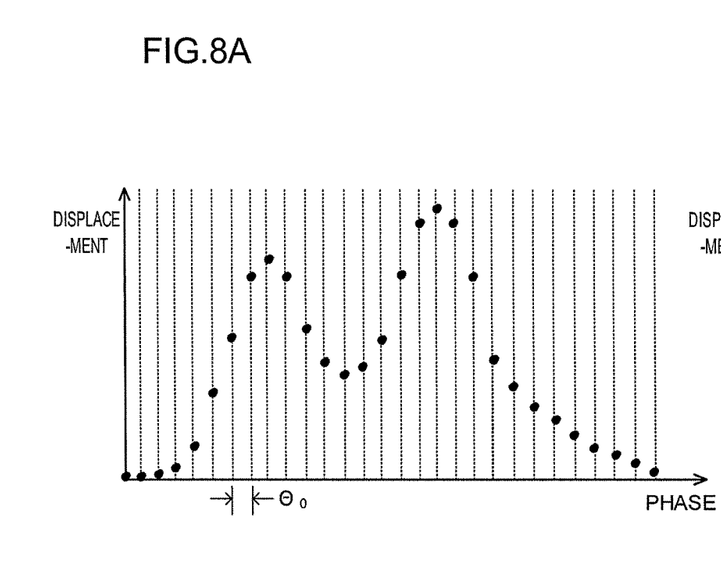
FIGS. 8A and 8B are diagrams illustrating an operation of a conventional cam profile data creation apparatus.
Figure 8B:
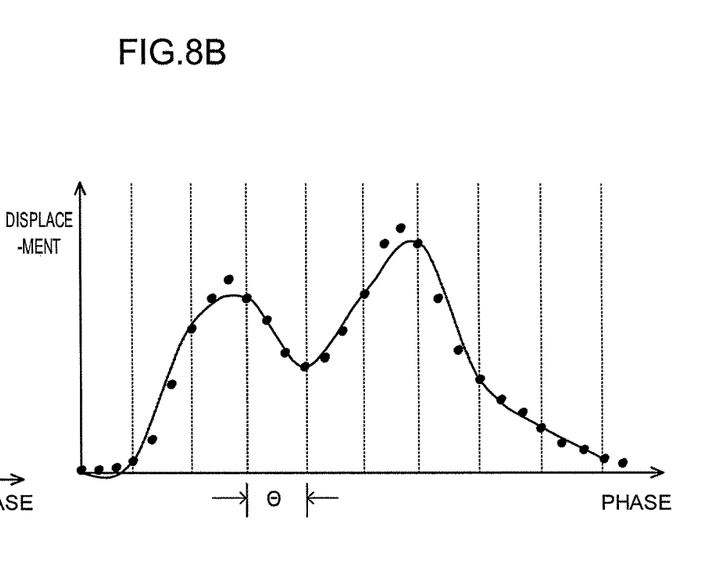

As illustrated in FIG. 8A, when a phase interval $\theta_0$ of the drive shaft defined in the cam profile data matches with the actual phase interval $\theta$ of the drive shaft, each definition point is absolutely instructed and the electronic cam operates as assumed when the cam profile data is created. On the other hand, when a rotation speed of the drive shaft is faster and the phase interval $\theta$ is larger than the phase interval $\theta_0$ of the drive shaft in the cam profile data, a definition point that is not instructed is caused. An actual operation of the driven shaft in this case may be as illustrated in a solid line in the graph of FIG. 8B. Thereby, an error is caused between an operation of the driven shaft defined in the cam profile data and an actual instruction operation for the driven shaft, and there occurs a problem that the electronic cam cannot produce a maximum stroke, for example. The error easily occurs particularly where a change in displacement is large.

Conventionally, the synchronization controller actually performs an instruction operation on the driven shaft to operate the electronic cam, confirms a positional deviation at this time, or an error between an actual displacement of the driven shaft and a displacement of the driven shaft defined in the cam profile data, and further carries out control for compensating the error, thereby solving the above problem. For example, Japanese Patent Application Laid-Open No. 07-104855 discloses an electronic cam control method for controlling a servo system in response to a position instruction, wherein if a phase delay due to a follow-up delay of a servo system with respect to a position instruction is caused, the phase delay is compensated by first issuing a position instruction in consideration of the phase delay.

According to the technique described in Japanese Patent Application Laid-Open No. 07-104855, mentioned above, the controller actually operates a machine to confirm a positional deviation. With such a method for making confirmation by actually operating a machine, however, the machine may sometimes erroneously operate, which is not preferable in terms of safety. Further, an instruction operation of an electronic cam is determined depending on a relationship between cam profile data and a rotation speed of the drive shaft, but in adjustment where a machine is actually operated, there is no method for visually confirming such relationship, as a result, the confirmation has to be made by trial and error, which will be a burdensome task. Therefore, it is desirable to confirm, before the machine is actually operated, the situation of generation of an error between an actual instruction operation for the driven shaft in a specified rotation speed of the drive shaft and definition points defined in cam profile data.

SUMMARY OF THE INVENTION

The present invention has been made in order to solve the problems, and it is an object thereof to provide a cam profile data creation apparatus and a synchronization controller capable of easily adjusting an error between an operation of a driven shaft defined in cam profile data and an actual instruction operation for the driven shaft.

A cam profile data creation apparatus according to the present invention includes: a cam profile data setting unit that sets cam profile data in which a phase of a drive shaft is associated with a set displacement as displacement of a driven shaft; a drive shaft rotation speed setting unit that sets a rotation speed of the drive shaft; an allowable error setting unit that sets an allowable error for a displacement of the driven shaft; a driven shaft displacement prediction unit that finds a predictive displacement as displacement of the driven shaft when the drive shaft rotates at the rotation speed based on the cam profile data; and a display unit that displays the set displacement and the predictive displacement in a manner such that they can be compared with each other and changes a form of the display depending on whether an error between the set displacement and the predictive displacement falls within the range of the allowable error.

The cam profile data creation apparatus further includes: a drive shaft rotation speed adjustment unit that changes the rotation speed of the drive shaft, and the driven shaft displacement prediction unit may change the predictive displacement depending on a change in the rotation speed.

The drive shaft rotation speed adjustment unit may be configured to autonomously change the rotation speed of the drive shaft and to calculate a maximum value of the rotation speed at which the error falls within the range of the allowable error.

The drive shaft rotation speed adjustment unit may be configured to gradually decrease the rotation speed set by the drive shaft rotation speed setting unit and calculate a maximum value of the rotation speed at which the error falls within the range of the allowable error.

Further, a synchronization controller according to the present invention is configured to be communicable with the cam profile data creation apparatus, and has a cam profile data recording unit that records the cam profile data set by the cam profile data setting unit, a maximum rotation speed recording unit that records a maximum value of the rotation speed calculated by the drive shaft rotation speed adjustment unit, and a drive shaft rotation speed control unit that rotates the drive shaft at a maximum value of the rotation speed and control a driven shaft based on the cam profile data.

According to the present invention, it is possible to provide a cam profile data creation apparatus and a synchronization controller capable of easily adjusting an error between an operation of a driven shaft defined in cam profile data and an actual instruction operation for the driven shaft.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

A cam profile data creation apparatus according to a first embodiment of the present invention will be first described with reference to FIGS. 1 to 5 and FIG. 9.

A structure of the cam profile data creation apparatus according to the present embodiment will be described with reference to the block diagram of FIG. 9.

A cam profile data creation apparatus 100 has a driven shaft displacement prediction unit 101, a drive shaft rotation speed setting unit 103, an allowable error setting unit 105, a display unit 107, a drive shaft rotation speed adjustment unit 109, and a cam profile data setting unit 111.

The cam profile data creation apparatus 100 is typically an information processing apparatus such as personal computer (PC) or microcomputer. A CPU (not illustrated) performs predetermined processings according to programs stored in a storage area so that the cam profile data creation apparatus 100 logically realizes various processing units.

Figure 2:
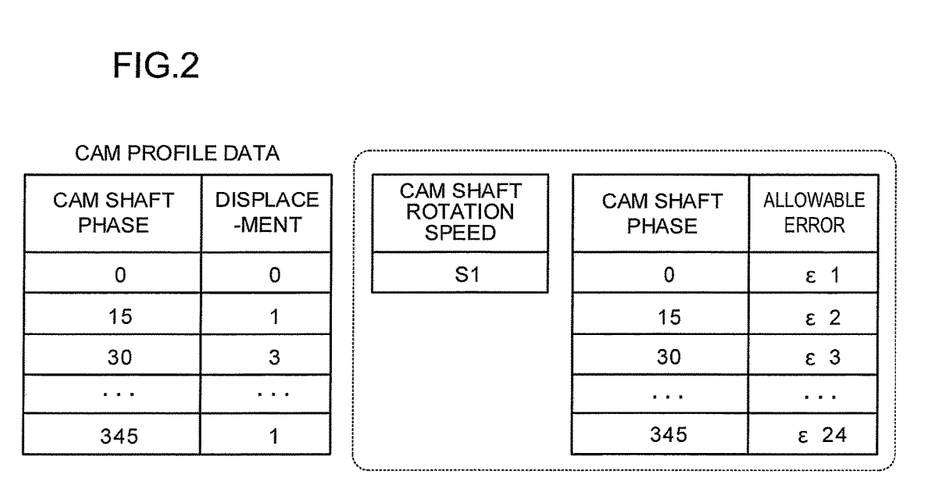
FIG. 2 is a diagram illustrating an example of setting of information to the cam profile data creation apparatus (FIG. 9) according to the first embodiment of the present invention.

The cam profile data setting unit 111 receives input cam profile data. The cam profile data is data in which a phase of a drive shaft is associated with a displacement of a driven shaft. The cam profile data setting unit 111 typically displays a table as illustrated in FIG. 2 on the display unit 107, receives user-input data, and stores the input result.

The drive shaft rotation speed setting unit 103 receives an input drive shaft rotation speed. The drive shaft rotation speed is indicated by an angular speed ω (rad/s) of the drive shaft, a rotation cycle T(s) of the drive shaft, or a revolution N (rpm) of the drive shaft, for example. The drive shaft rotation speed setting unit 103 typically displays a table as illustrated in FIG. 2 on the display unit 107, receives a user-input numerical value, and stores the input result.

The allowable error setting unit 105 receives an input allowable error. The allowable error is a value indicating a difference between a displacement of the driven shaft defined as cam profile data and a predictive displacement of the driven shaft in an actual instruction operation. The allowable error may be defined with a different value for each phase of the drive shaft as illustrated in FIG. 2. The allowable error setting unit 105 typically displays a table as illustrated in FIG. 2 on the display unit 107, receives a user-input numerical value, and stores the input result.

The driven shaft displacement prediction unit 101 performs a processing of predicting a displacement of the driven shaft when the drive shaft is rotated at a rotation speed set by the drive shaft rotation speed setting unit 103 based on the cam profile data set by the cam profile data setting unit 111. For example, the driven shaft displacement prediction unit 101 plots the definition points set by the cam profile data setting unit 111 on a two-axis orthogonal coordinate plane in which a phase of the drive shaft is assumed as first axis and a displacement of the driven shaft is assumed as second axis.

The driven shaft displacement prediction unit 101 then extracts a definition point to be actually subjected to an instruction operation by use of a rotation speed set by the drive shaft rotation speed setting unit 103. For example, it is assumed that the cam profile data is defined at an interval of 15°, a rotation speed of the drive shaft is 360° per second, and a control cycle τ of the synchronization controller 200 is ⅛ second. In this case, a phase interval is assumed at 360/8=45°. In other words, the instruction operation is performed each time the displacement of the drive shaft changes by 45°. Then, substantially one-third of the definition points originally defined per phase of 15° of the drive shaft are used for the instruction operation. The driven shaft displacement prediction unit 101 extracts definition points usable for the instruction operation and calculates an approximate curve connecting the extracted definition points as the phase interval progresses. The approximate curve indicates a motion of the driven shaft along the actual instruction operation.

Figure 1:
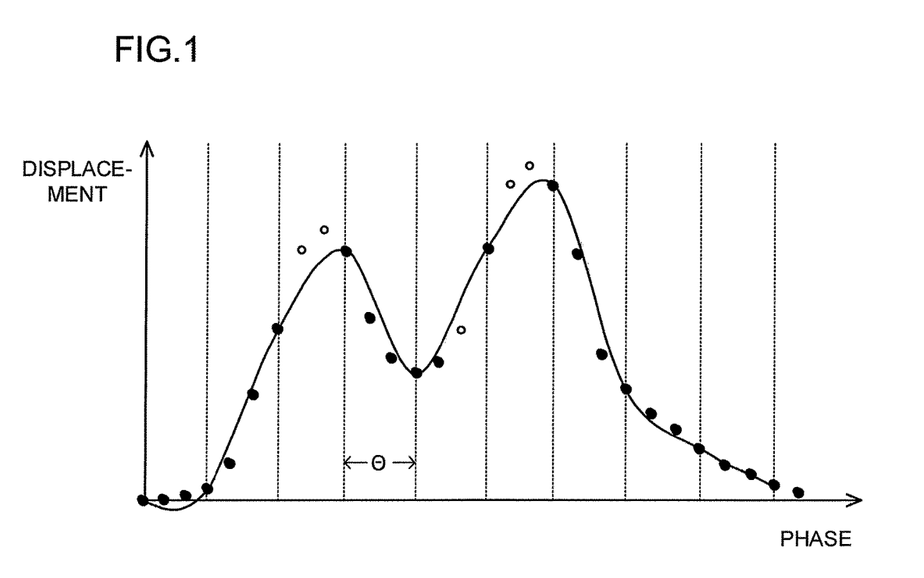
FIG. 1 is a diagram illustrating an operation of a cam profile data creation apparatus according to a first embodiment of the present invention (diagram illustrating that a driven shaft displacement prediction unit in a cam profile data creation apparatus of FIG. 9 superimposes the set definition points on an approximate curve on a coordinate plane to be displayed on a display unit)

The driven shaft displacement prediction unit 101 then superimposes the definition points set by the cam profile data setting unit 111 and the approximate curve on the coordinate plane as illustrated in FIG. 1 to display them on the display unit 107. In FIG. 1, an interval θ between the vertical lines indicates a phase interval. In the example, it is possible to visually grasp that about ⅓ of the definition points are used for generating the approximate curve depending on a phase interval.

Herein, the driven shaft displacement prediction unit 101 calculates an error between each of the displayed definition points and the approximate curve, that is, a difference in the amount of displacement. Then, the driven shaft displacement prediction unit 101 can change a display form of the definition points depending on whether or not the error exceeds the allowable error set by the allowable error setting unit 105. In the example of FIG. 1, the definition points at which the error exceeds the allowable error are indicated by "○" and the definition points at which the error falls within the range of the allowable error are indicated by "●."

Figure 4:
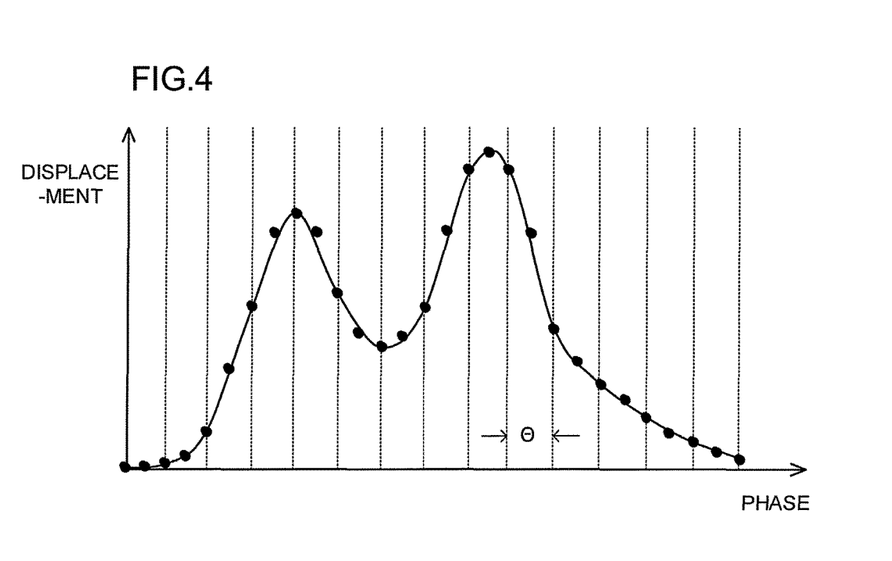
FIG. 4 is a diagram illustrating an operation of the cam profile data creation apparatus (FIG. 9) according to the first embodiment of the present invention.
Figure 5:
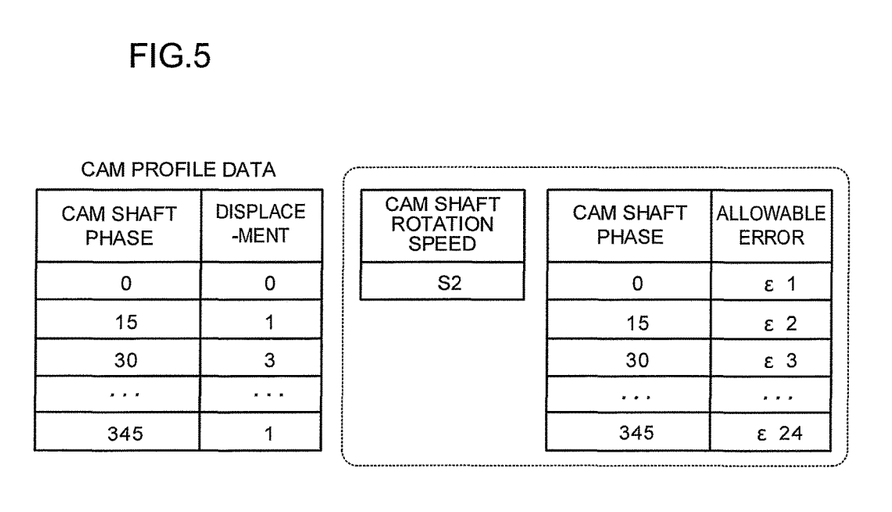
FIG. 5 is a diagram illustrating how to set information to the cam profile data creation apparatus in the cam profile data creation apparatus (FIG. 9) according to the first embodiment of the present invention.

The drive shaft rotation speed adjustment unit 109 receives an input to change the rotation speed of the drive shaft set by the drive shaft rotation speed setting unit 103. For example, the drive shaft rotation speed adjustment unit 109 receives an input to vary the interval θ between the vertical lines or a phase interval as illustrated in FIG. 4. Narrowing the phase interval θ is equivalent to decreasing rotation speed of the drive shaft. Alternatively, the drive shaft rotation speed adjustment unit 109 may update the rotation speed of the drive shaft by directly receiving an input of numerical value as illustrated in FIG. 5.

Figure 3A:
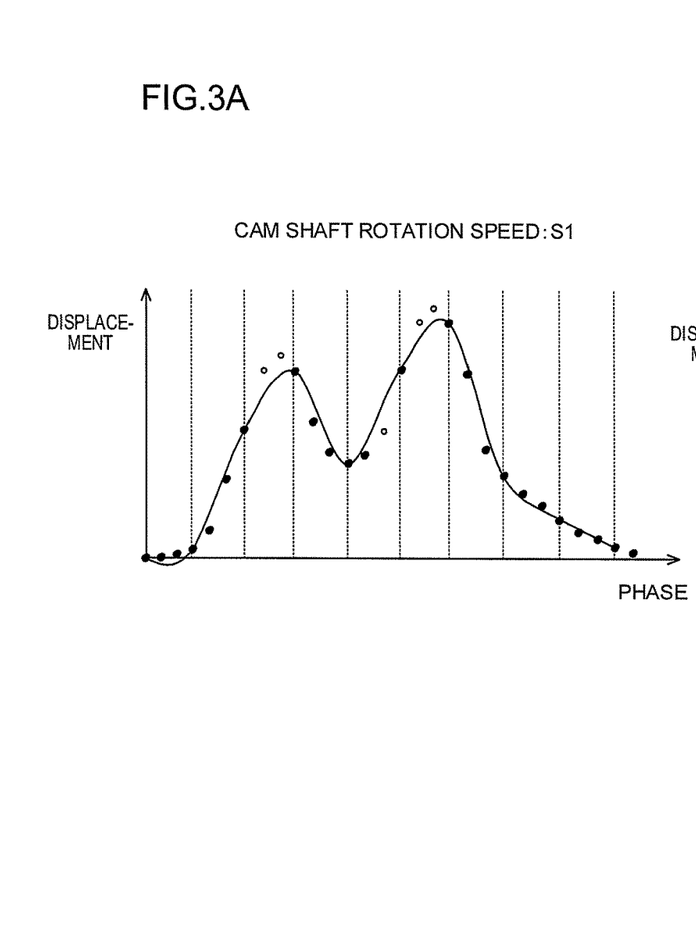
FIGS. 3A and 3B are diagrams for explaining the operations of the cam profile data creation apparatus in the cam profile data creation apparatus (FIG. 9) according to the first embodiment of the present invention (the changes of the approximate curve when a rotation speed of a drive shaft is decreased from S1 (FIG. 3A) to S2 (FIG. 3B)
Figure 3B:
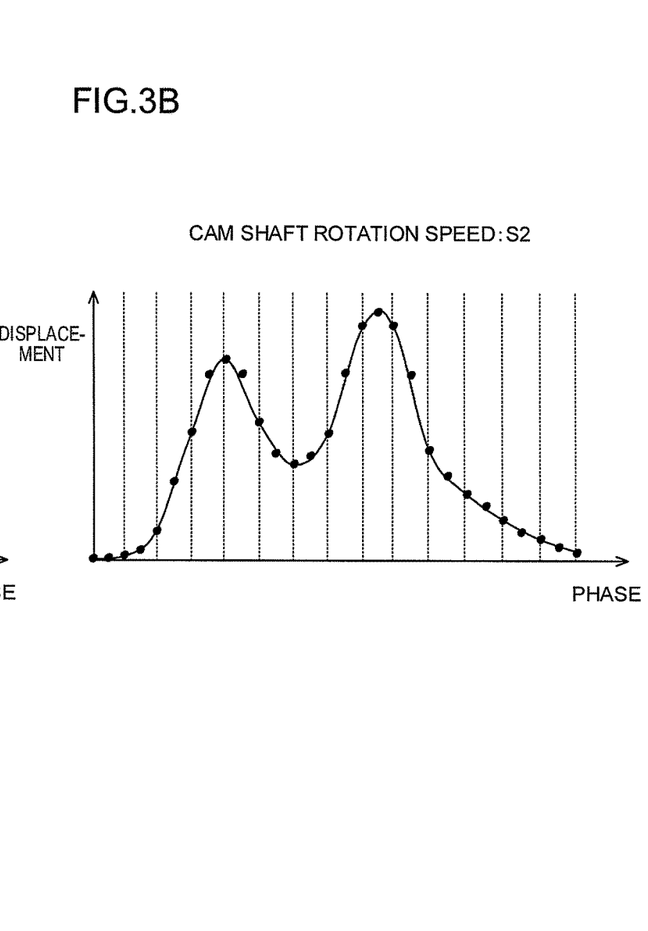

The changes in the approximate curve when the rotation speed of the drive shaft is decreased will be described with reference to FIGS. 3A and 3B.

Generally, when the rotation speed of the drive shaft is decreased, the phase interval becomes narrower and the number of definition points used for an instruction operation increases so that an error between a definition point and the approximate curve becomes smaller. Thus, typically, the rotation speed of the drive shaft is gradually decreased in order to find a rotation speed at which the operation of the driven shaft can be realized, where an instruction operation similar to the cam profile data can be achieved or the error of the displacement falls within the range of the allowable error.

When the rotation speed of the drive shaft (cam shaft) is decreased from S1, the difference between any of the definition points and the approximate curve falls within the range of the allowable error at the rotation speed of S2. On the display screen, some definition points are indicated by "○" at the rotation speed S1 as illustrated in FIG. 3A, while all the definition points are indicated by "●" at the rotation speed S2 as illustrated in FIG. 3B. At this time, the approximate curve takes almost the same profile as the cam profile data. That is, the rotation speed S2 of the drive shaft is the maximum rotation speed at which the same instruction operation as the cam profile data can be performed.

According to the present embodiment, the cam profile data creation apparatus 100 visually displays a profile error between the instruction operation for the driven shaft based on the designated rotation speed of the drive shaft and the displacement of the driven shaft defined by the cam profile data. Thereby, it is possible to adjust a rotation speed of the drive shaft safely in a short time thereby to find an optimum rotation speed without actually operating the machine.

Further, according to the present embodiment, the drive shaft rotation speed adjustment unit 109 provides a unit configured to adjust a rotation speed of the drive shaft on the graph. Further, a unit configured to adjust a rotation speed of the drive shaft by input of numerical values can be provided. Thereby, it is possible to easily find an optimum rotation speed of the drive shaft, preferably a maximum rotation speed at which the error falls within the range of the allowable error. Thus, it is possible to efficiently perform the work of adjusting the instruction operation.

The cam profile data creation apparatus according to a second embodiment of the present invention will be described below with reference to FIGS. 6A to 6C and FIG. 7.

Figure 9:
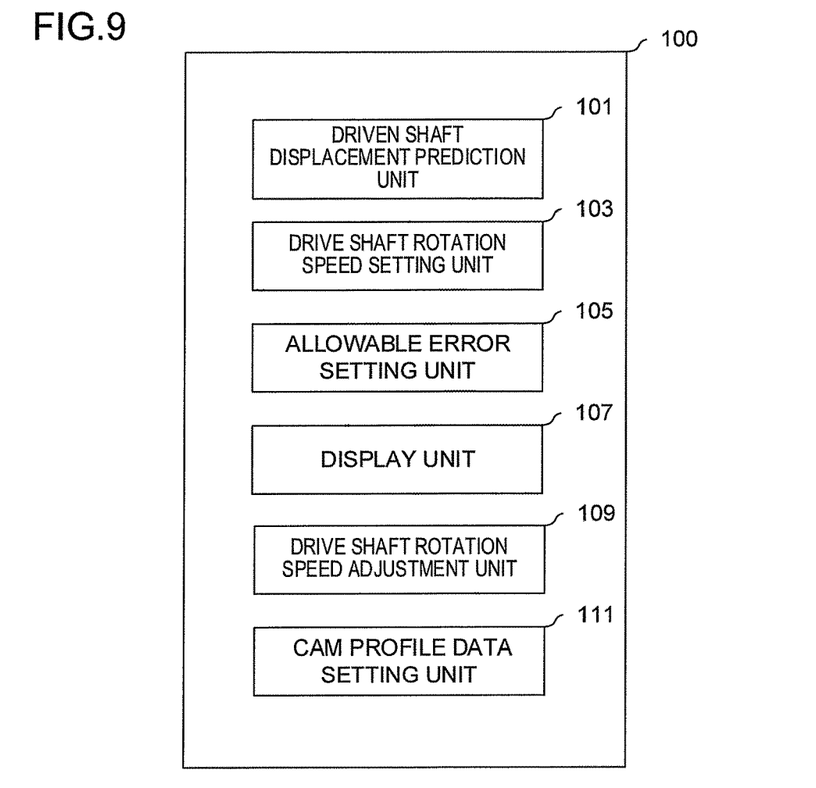
FIG. 9 is a block diagram illustrating a structure of the cam profile data creation apparatus according to the first and second embodiment.

A structure of the cam profile data creation apparatus according to the present embodiment can be illustrated in the block diagram of FIG. 9, similarly to the cam profile data creation apparatus according to the first embodiment. According to the present embodiment, the drive shaft rotation speed adjustment unit 109 in FIG. 9 is characterized by automatically finding a maximum rotation speed of the drive shaft at which an error between a definition point and an approximate curve falls within the range of the allowable error.

Figure 6A:
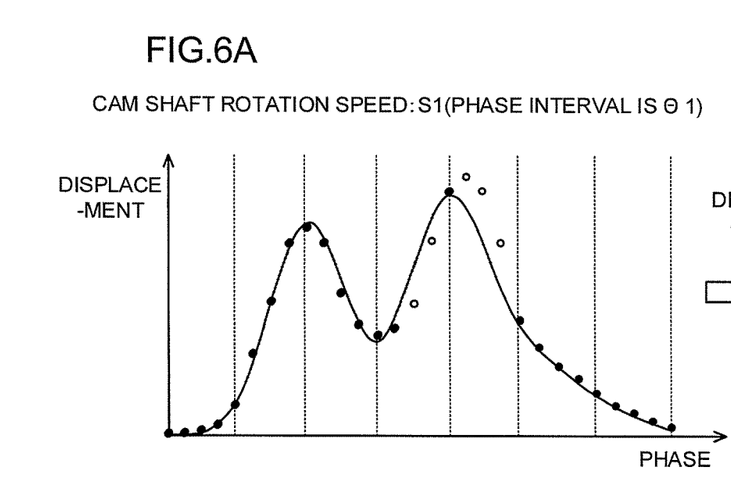
FIGS. 6A to 6C are diagrams for explaining the operations of the cam profile data creation apparatus (FIG. 9) according to a second embodiment of the present invention (the changes in an approximate curve when a rotation speed of the drive shaft is decreased from S1 (FIG. 6A) to S2 (FIG. 6B) and S3 (FIG. 6C))
Figure 6B:
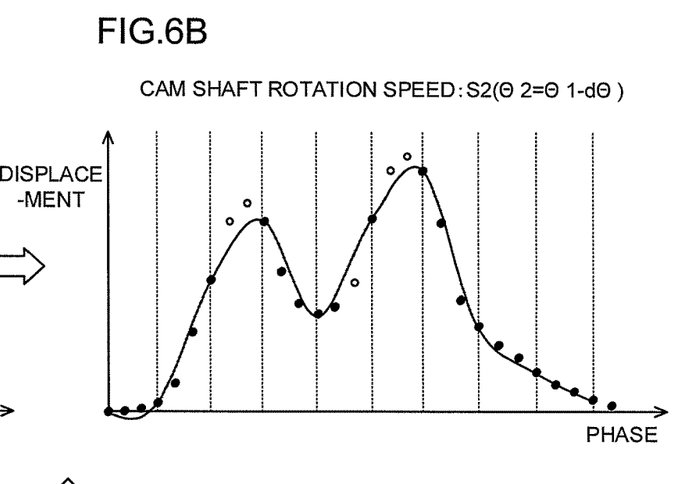
Figure 6C:
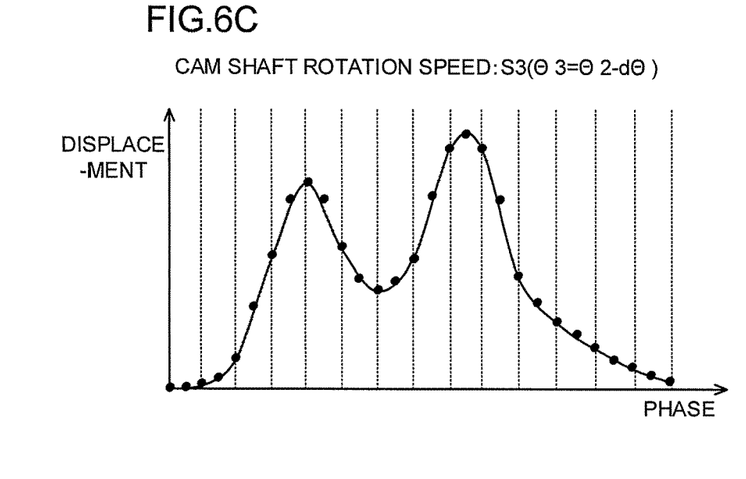

When an error between at least one of definition points of the cam profile data and the approximate curve exceeds the allowable error, the drive shaft rotation speed adjustment unit 109 in the cam profile data creation apparatus according to the present embodiment sequentially decreases the rotation speed of the drive shaft (cam shaft) from the rotation speed S1 (FIG. 6A) set by the drive shaft rotation speed setting unit 103 to the rotation speed S2 (FIG. 6B) and the rotation speed S3 (FIG. 6C) at a constant ratio. That is, as illustrated in FIGS. 6A and 6C, the phase interval θ is narrowed by dθ. Every time the rotation speed of the drive shaft decreases, in other words, every time the phase interval θ decreases by dθ, the driven shaft displacement prediction unit 101 evaluates an error between a definition point and the approximate curve. Then as illustrated in FIG. 6C, when all the definition points of the cam profile data fall within the range of the allowable error for the first time (when "○" indicating a definition point at which an error exceeds the allowable error disappears from the screen), the drive shaft rotation speed adjustment unit 109 outputs the rotation speed (S3) of the drive shaft at this time as clamp rotation speed.

Figure 7:
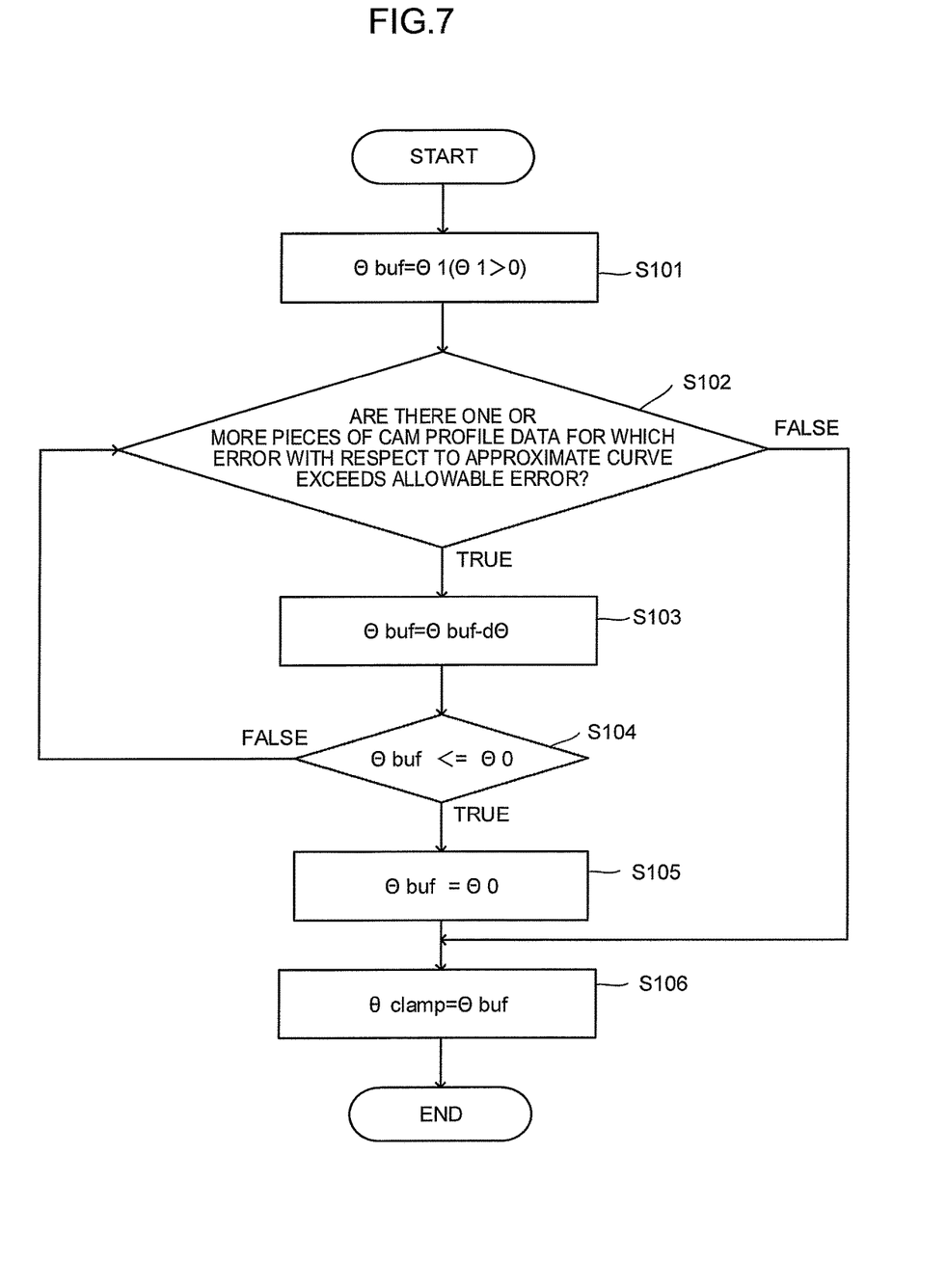
FIG. 7 is a flowchart for explaining a flow of a processing of finding a clamp rotation speed by a drive shaft rotation speed adjustment unit in the cam profile data creation apparatus (FIG. 9) according to the second embodiment of the present invention.

A flow of the processing of finding a clamp rotation speed by the drive shaft rotation speed adjustment unit 109 in the cam profile data creation apparatus according to the present embodiment will be described with reference to the flowchart of FIG. 7. The processing in each step will be described below.

[Step S101] The drive shaft rotation speed adjustment unit 109 assumes a phase interval θ1 corresponding to a rotation speed of the drive shaft set by the drive shaft rotation speed setting unit 103 as θbuf. Herein, θbuf is a variable at which the phase interval is temporarily stored.

[Step S102] A determination is made, when the phase interval is θbuf, as to whether one or more definition points at which an error between the definition point and the approximate curve exceeds the allowable error are caused or not. When such one or more definition points are caused, the processing proceeds to step S103, and when such a definition point is not caused, the processing proceeds to step S106.

[Step S103] Since an error between the approximate curve and a definition point exceeds the allowable error, the phase interval is narrowed. That is, the phase interval θbuf is replaced with θbuf-dθ to updated the phase interval θbuf. Herein, dθ is a range of reduction in phase interval.

[Step S104] Herein, a check is made as to whether the phase interval θbuf is equal to or less than the phase interval $θ_0$ of the drive shaft defined in the cam profile data. When the phase interval θbuf is the interval $θ_0$ or less, the processing proceeds to step S105, and otherwise, the processing proceeds to step S102 to evaluate an error again by use of new θbuf.

[Step S105] Since the phase interval θbuf is equal to or less than the phase interval $θ_0$ of the drive shaft defined in the cam profile data, $θ_0$ is set to θbuf. This is because when θbuf is equal to $θ_0$, all the definition points are to be instructed and the error is made 0.

[Step S106] θbuf is output as θclamp. Herein, θclamp is a phase interval corresponding to the clamp rotation speed of the drive shaft.

The cam profile data creation apparatus 100 can calculate and output a clamp rotation speed based on the phase interval θclamp. The calculation method is as in the following equations.

Angular speedωclamp(rad/s)=θclamp/τ

Cycle Tclamp(s)=2π/ωclamp=2πτ/θclamp

Speed of revolution Nclamp(rpm)=1/Tclamp×60=θclamp/2πτ×60

With the cam profile data creation apparatus according to the present embodiment, the drive shaft rotation speed adjustment unit 109 calculates a maximum rotation speed of the drive shaft at which an error between an instruction operation for the driven shaft and a displacement of the driven shaft defined in the cam profile data falls within the range of the allowable error. Thereby, the efficiency of the work of adjusting the instruction operation can be remarkably enhanced.

A synchronization controller according to a third embodiment of the present invention will be described below with reference to FIG. 10.

The present embodiment is directed to a synchronization controller 200 operating based on cam profile data set by the cam profile data creation apparatus 100 according to the first embodiment and a clamp rotation speed of the drive shaft calculated according to the second embodiment.

Figure 10:
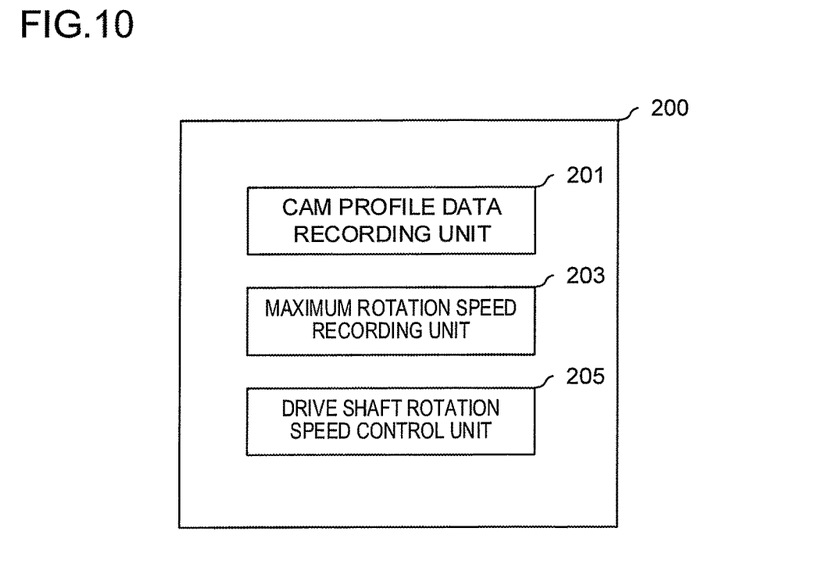
FIG. 10 is a block diagram illustrating a structure of a synchronization controller according to a third embodiment of the present invention.

As illustrated in FIG. 10, the synchronization controller 200 has a cam profile data recording unit 201, a maximum rotation speed recording unit 203, and a drive shaft rotation speed control unit 205. The synchronization controller 200 is preferably connected to the cam profile data creation apparatus 100 to be communicable therewith.

The synchronization controller 200 is typically constituted by a numerical controller. A CPU performs predetermined processings according to programs stored in a storage area so that the synchronization controller 200 logically realizes various processing units.

The cam profile data recording unit 201 acquires and records the cam profile data set by the cam profile data setting unit 111 from the cam profile data creation apparatus 100. The maximum rotation speed recording unit 203 acquires and records the clamp rotation speed calculated by the drive shaft rotation speed adjustment unit 109 from the cam profile data creation apparatus 100.

The drive shaft rotation speed control unit 205 sets the rotation speed of the drive shaft to the clamp rotation speed recorded by the maximum rotation speed recording unit 203, and performs the instruction operation.

According to the present embodiment, the synchronization controller 200 can clamp the instruction rotation speed of the drive shaft of the synchronization controller 200 by use of the maximum rotation speed of the drive shaft calculated by the cam profile data creation apparatus 100. Thereby, the efficiency of the work of adjusting the instruction operation can be remarkably enhanced.

The present invention is not limited to the above embodiments, and can be changed as needed within the scope without departing from the intent and purpose. For example, the first embodiment is configured such that the cam profile data creation apparatus 100 visually displays a profile error between an instruction operation for the driven shaft and a displacement of the driven shaft defined in the cam profile data at a rotation speed in response to designation of the rotation speed of the drive shaft. On the other hand, the second embodiment is configured such that the cam profile data creation apparatus 100 automatically calculates an optimum rotation speed of the drive shaft. Thus, the second embodiment may not be necessarily configured such that a profile error is visually displayed.

The above embodiments describe the example in which the definition points set by the cam profile data setting unit 111 and the approximate curve calculated by the driven shaft displacement prediction unit 101 are displayed on a graph by the display unit 107. However, the displacement, phase or error indicated by the definition points and the approximate curve may be simply displayed in numerical values instead of the graph.

The invention claimed is:

1. A control system for controlling an electronic cam, the control system comprising:
   a processor configured to:
     set cam profile data in which a phase of a drive shaft of the electronic cam is associated with a set displacement as displacement of a driven shaft of the electronic cam;
     set a rotation speed of the drive shaft;
     set an allowable error for a displacement of the driven shaft;
     find a predictive displacement as displacement of the driven shaft when the drive shaft rotates at the rotation speed based on the cam profile data;
   a display configured to display the set displacement and the predictive displacement in a manner such that they can be compared with each other and changes a form of the display depending on whether an error between the set displacement and the predictive displacement falls within the range of the allowable error; and
   a controller configured to receive the rotation speed from the processor and control the electronic cam by controlling the drive shaft to rotate at the rotation speed when the comparison indicates that error falls within the range of the allowable error.

2. The cam profile data creation system according to claim 1,
   wherein the processor is further configured to:
     change the rotation speed of the drive shaft, and
     change the predictive displacement depending on a change in the rotation speed.

3. The cam profile data creation system according to claim 2, wherein the processor is further configured to autonomously change the rotation speed of the drive shaft and to calculate a maximum value of the rotation speed at which the error falls within the range of the allowable error.

4. The cam profile data creation system according to claim 3,
wherein the processor is further configured to gradually decrease the rotation speed set by the drive shaft rotation speed setting unit and calculate a maximum value of the rotation speed at which the error falls within the range of the allowable error.

5. The cam profile data creation system according to claim 3,
wherein the processor is further configured to:
record the cam profile data;
record a maximum value of the rotation speed; and
wherein the controller is further configured to:
rotate the drive shaft at a maximum value of the rotation speed and control a driven shaft based on the cam profile data.

\* \* \* \* \*